(12) United States Patent
Aoyama et al.

(10) Patent No.: US 7,677,627 B2
(45) Date of Patent: Mar. 16, 2010

(54) VEHICLE WITH CABIN

(75) Inventors: Kenichi Aoyama, Sakai (JP); Makoto Shinohara, Sakai (JP)

(73) Assignee: Kubota Corporation, Osaka (JP)

( * ) Notice: Subject to any disclaimer, the term of this patent is extended or adjusted under 35 U.S.C. 154(b) by 46 days.

(21) Appl. No.: 11/853,480

(22) Filed: Sep. 11, 2007

(65) Prior Publication Data

US 2008/0136207 A1  Jun. 12, 2008

(30) Foreign Application Priority Data

Dec. 6, 2006  (JP) .............................. 2006-329393

(51) Int. Cl.
    *B62D 27/04* (2006.01)
(52) U.S. Cl. ..................... 296/35.1; 296/1.03
(58) Field of Classification Search ................ 296/35.1, 296/1.03
    See application file for complete search history.

(56) References Cited

U.S. PATENT DOCUMENTS 4,043,585 A * 8/1977 Yamanaka ................. 296/35.1

5,409,283 A * 4/1995 Ban .......................... 296/35.1

FOREIGN PATENT DOCUMENTS

| JP | 09-039832 | 2/1997 |
|----|-----------|--------|
| JP | 2000053031 | 2/2000 |
| JP | 2000233688 | 8/2000 |
| JP | 2001163267 | 6/2001 |
| JP | 2001171565 | 6/2001 |

* cited by examiner

*Primary Examiner*—Dennis H Pedder
(74) *Attorney, Agent, or Firm*—The Webb Law Firm

(57) ABSTRACT

A vehicle with a cabin comprising:
  a vehicle body supported by a plurality of wheels;
  a cabin bracket supported by the vehicle body; and
  an elastic member disposed between the cabin bracket and the cabin, wherein
  the cabin bracket comprises:
  a fixed member fixed to the vehicle body,
  a higher rigidity portion extended to the outward side of the body from the fixed member, and
  a lower rigidity portion that is extended to the outward side from the end portion of the outward side of the higher rigidity portion, and that is lower in rigidity in the vertical direction than the higher rigidity portion; and
  a vibration suppressing weight disposed at the end portion in the outward direction of the cabin bracket.

5 Claims, 10 Drawing Sheets

VEHICLE WITH CABIN

BACKGROUND OF THE INVENTION

1. Field of the Invention

The present invention relates to a vehicle with a cabin.

2. Description of the Related Art

Known in the art are a vehicle with a cabin as disclosed in Japanese Laid-open Patent Application No. 2000-233688, for example, in which the cabin is supported via a vibration isolation member on the upper surface side of a cabin bracket that is extended in the left and right directions from a transmission case, and a vehicle with a cabin as disclosed in Japanese Laid-open Patent Application No. 2001-163267, for example, in which the cabin is supported via a vibration isolation member on the upper surface side of a cabin bracket that is extended in the left and right directions from a clutch housing.

In the conventional vehicle with a cabin disclosed in Japanese Laid-open Patent Application No. 2000-233688, the generation of a muffled noise is prevented by a configuration in which a damping mass is provided, and the resonance frequency of air inside the cabin and the oscillation frequency of the vibrations transmitted to the cabin via the vibration isolation member and the cabin bracket are not liable to match, even if resonance or the like occurs within the cabin. In the conventional vehicle with a cabin disclosed in Japanese Laid-open Patent Application No. 2001-163267, the generation of a muffled noise is prevented by a configuration in which a weight for vibration isolation is provided, and the resonance frequency of air inside the cabin and the oscillation frequency of the vibrations transmitted to the cabin via the vibration isolation member and the cabin bracket are not liable to match, even if resonance or the like occurs within the cabin.

However, in the conventional vehicles with a cabin disclosed in the documents described above, the cabin bracket is configured so as to have a substantially uniform high rigidity from the fixed member of the cabin bracket to the distal end portion of the cabin bracket, and the characteristic frequency of the cabin brackets has a substantially uniform high value from the fixed member to the distal end portion. For this reason, the characteristic vibration of the cabin bracket as such does not vary even if a damping mass or a weight for vibration isolation is provided. There is therefore a problem in that it is difficult to have configuration in which the resonance frequency of air inside the cabin and the oscillation frequency of the vibrations transmitted to the cabin via the vibration isolation member and the cabin bracket are not liable to match.

SUMMARY OF THE INVENTION

An object of the present invention is to provide a vehicle with a cabin in which a configuration is easily achieved wherein the resonance frequency of air inside the cabin and the oscillation frequency of the vibrations transmitted to the cabin via the vibration isolation member and the cabin bracket are not liable to match.

The vehicle with a cabin of the present invention comprises:

a vehicle body supported by a plurality of wheels;

a cabin bracket supported by said vehicle body; and an elastic member disposed between said cabin bracket and said cabin, wherein said cabin bracket comprises:

a fixed member fixed to said vehicle body, a higher rigidity portion extended laterally outwardly of said body from said fixed member, and a lower rigidity portion that extends laterally outwardly from a lateral outward end portion of said higher rigidity portion, and that is lower in rigidity in the vertical direction than said higher rigidity portion; and a vibration suppressing weight disposed at a lateral outward end portion of said cabin bracket.

With the above-described configuration, vibrations produced by the engine or by movement can be transmitted to the cabin via a lower rigidity portion that has low rigidity and a low characteristic frequency while retaining the strength of the cabin bracket with the aid of the higher rigidity portion, and the characteristic frequency of the cabin bracket can be kept at a low frequency. Also, the characteristic frequency of the cabin bracket can be adjusted by a vibration suppressing weight. As a result, the oscillation frequency of the vibrations transmitted to the cabin via the cabin bracket and the vibration isolation member can be adjusted to a low value.

DETAILED DESCRIPTION OF PREFERRED EMBODIMENTS

Preferred embodiments of the present invention will be described next with reference to the accompanying drawings. A number of embodiments will be described below, but combinations of the characteristics of one embodiment and the characteristics of another embodiment are also contained within the scope of the present invention.

(Overall Configuration of the Tractor)

Figure 1:
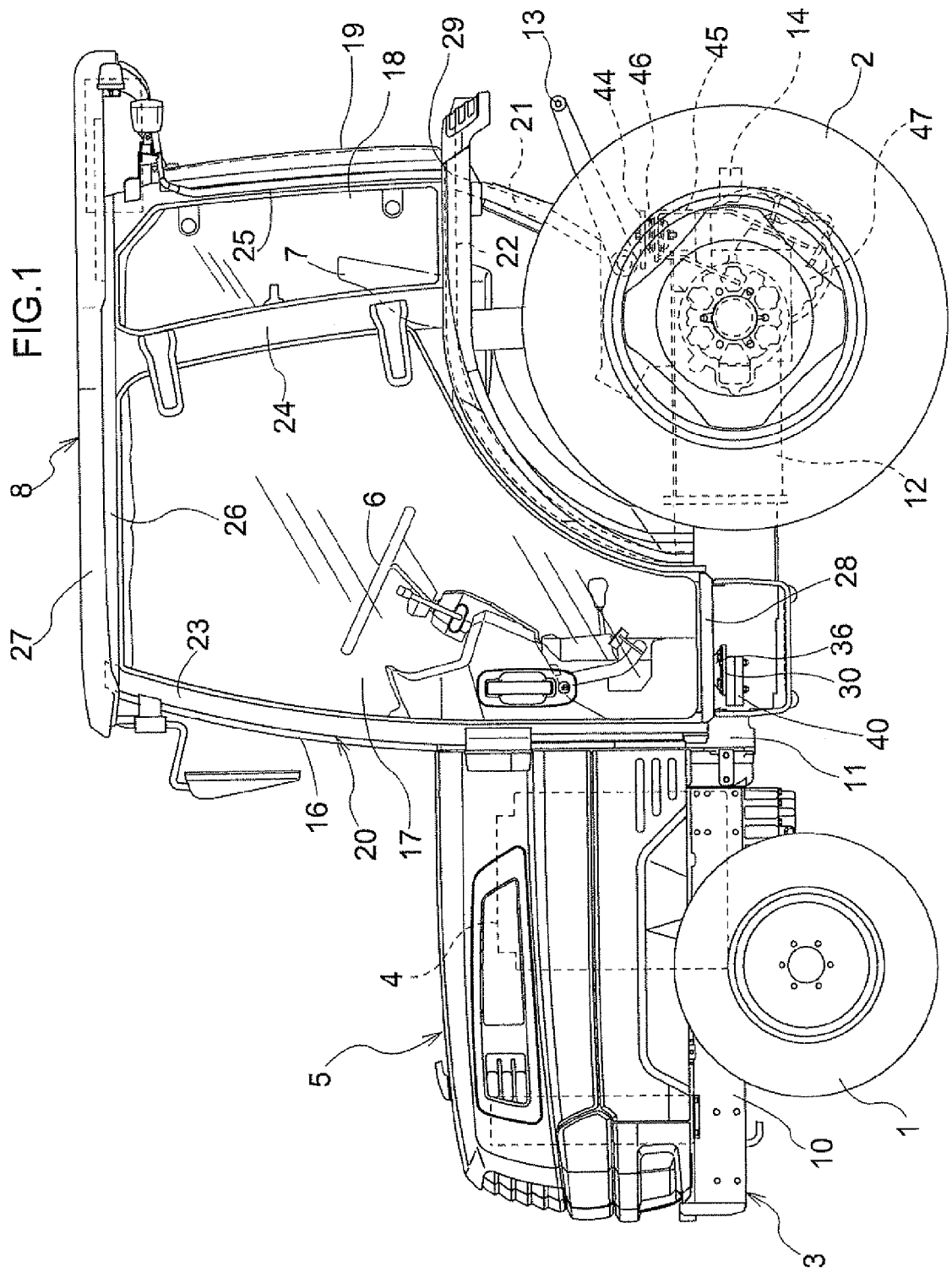
FIG. 1 is a left side view of an entire tractor.
Figure 2:
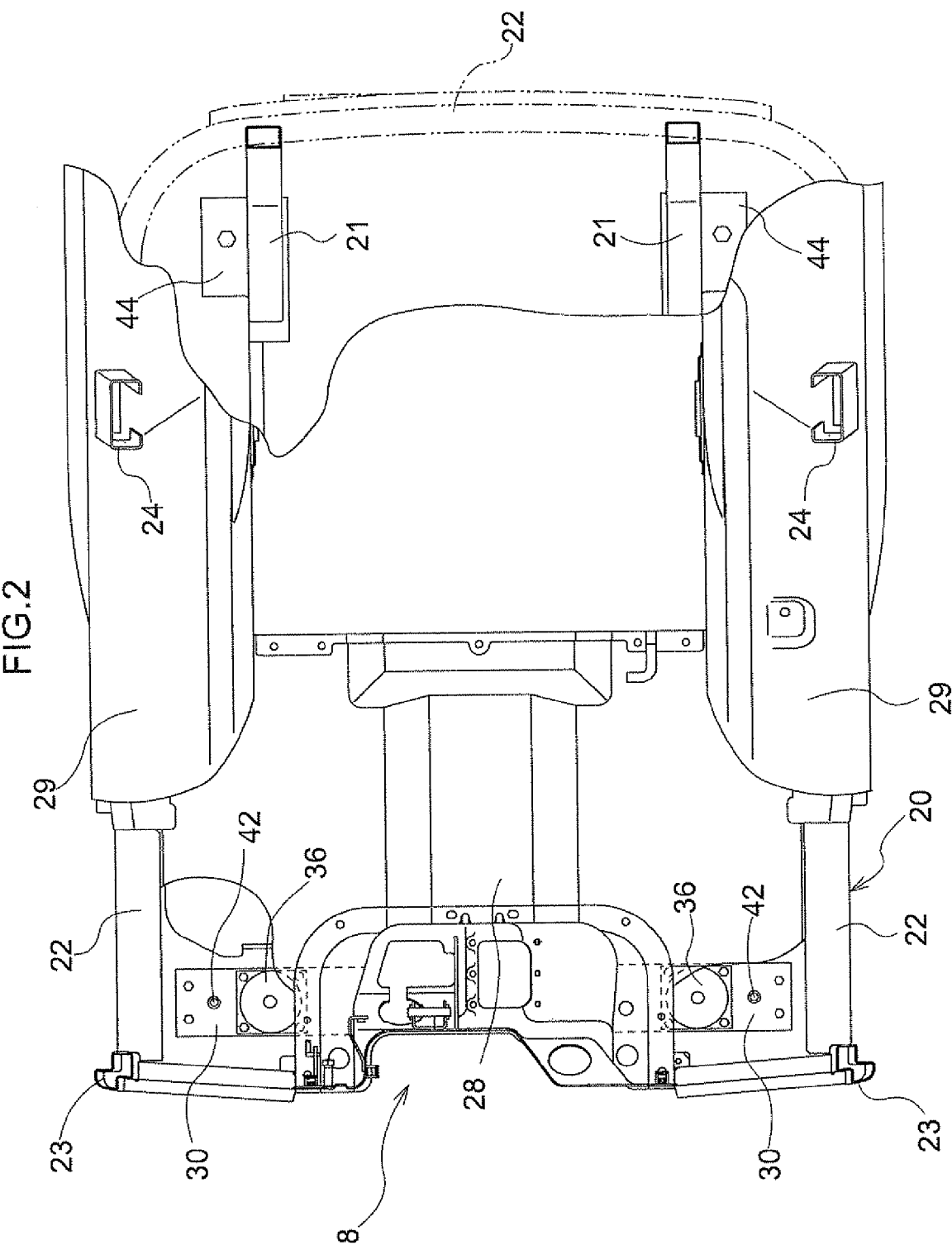
FIG. 2 is a transverse plan view showing the support structure of the cabin.
Figure 3:
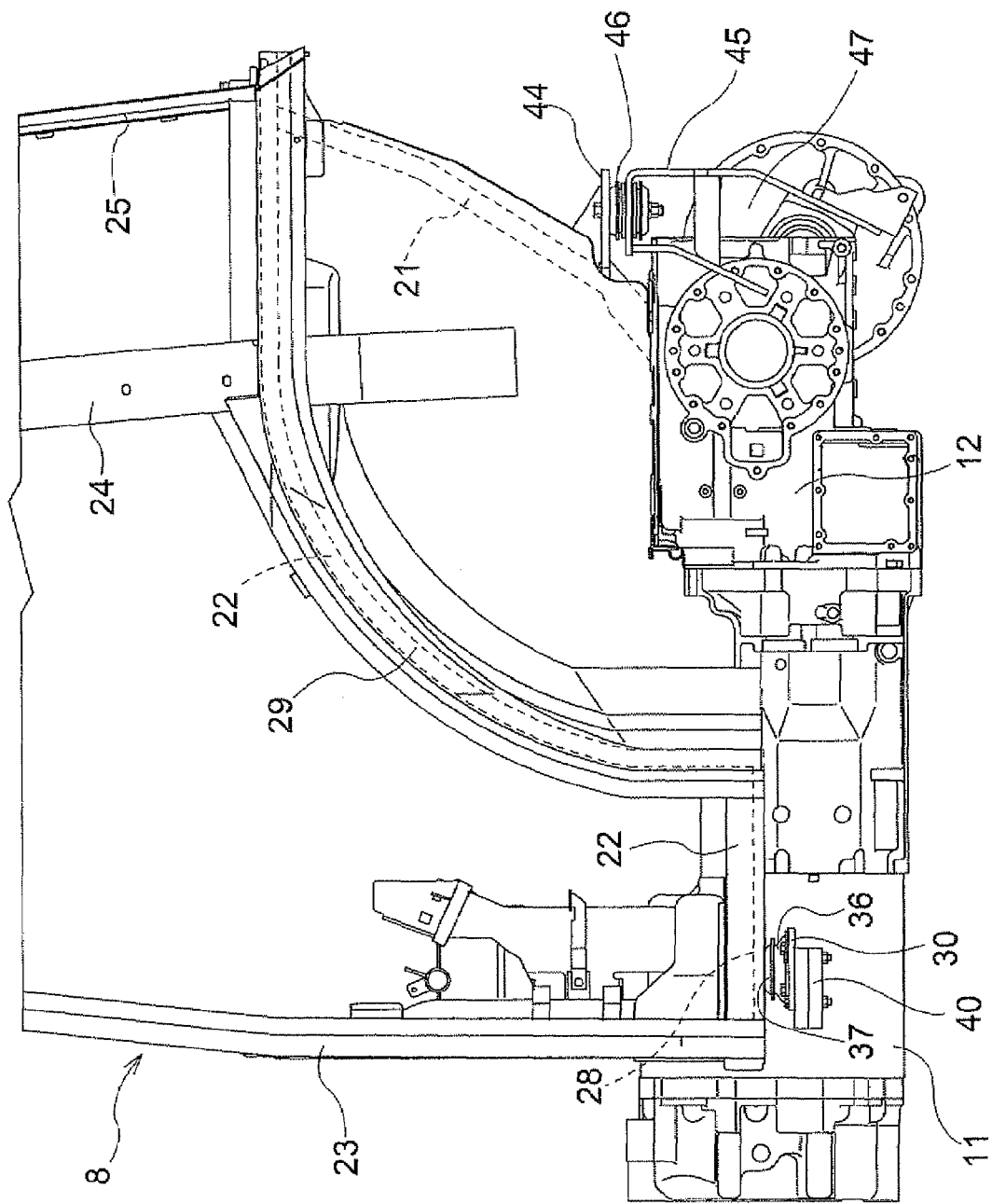
FIG. 3 is a left side view of the support structure of the cabin.

The overall configuration of a tractor as an example of a vehicle provided with a cabin bracket 30 according to the present invention will be described with reference to FIGS. 1 to 3. FIG. 1 shows a side view of an entire tractor provided with a cabin bracket 30 and a vibration suppressing weight 40. FIGS. 2 and 3 are a transverse plan view and a side view of the main parts showing the structure of a cabin 8 and the mounted structure of the cabin 8, respectively.

The tractor has a four-wheel drive configuration in which the vehicle body 3 is provided with a left/right pair of steerable and drivable front wheels 1, and a left/right pair of drivable rear wheels 2, as shown in FIG. 1. The front portion of the vehicle body 3 is provided with a hood 5 that houses an engine 4 or the like, and the rear portion of the vehicle body 3 is provided with a cabin 8 that houses a steering wheel 6, a driver's seat 7, and the like.

A front frame 10 extends forward from the lower portion of the engine 4; and an axle housing or the like (not shown) on which the front wheels 1 are mounted is supported on the front frame 10. A clutch housing 11 extends rearward from the engine 4, a transmission case 12 positioned below the driver's seat 7 is linked to the clutch housing 11, and power from the engine 4 is configured to be transmitted to the rear wheels 2.

The rear portion of the vehicle body 3 is provided with a link mechanism 13 and a power take-off shaft 14; a rotary cultivator or the like (not shown) is elevatably linked to the link mechanism 13; and the rotary cultivator or the like is linked in an interlocking manner with the power take-off shaft 14, whereby the rotary cultivator or the like is elevatably and drivably configured.

The cabin 8 is composed of a cabin frame 20, a front glass 16 that covers the front side of the cabin frame 20, a slidably openable door 17 disposed in the opening of the two sides of the cabin frame 20, a side glass 18 disposed behind the door 17, a rear glass 19 that covers the rear side of the cabin frame 20, and other components, as shown in FIGS. 1 to 3.

The cabin frame 20 is composed of a support frame 21 that supports the cabin 8, a lower frame 22 connected to the support frame 21, and other components. Extending above the front end portion, rear portion, and rear end portion of the lower frame 22 are a left/right pair of front vertical frames 23, a left/right pair of middle vertical frames 24, and a left/right pair of rear vertical frames 25; and the front vertical frames 23, middle vertical frames 24, and rear vertical frames 25 are connected to the upper frame 26. The various types of frames constituting the cabin frame 20 are formed by welding and molding pipe material or the like.

The upper portion of the cabin frame 20 is covered from above by a resin roof panel 27 that has been made hollow by blow molding, and the roof panel 27 is fixed to the upper frame 26 via a seal member (not shown). A floor panel 28 that forms the floor of the cabin 8 is connected to the lower surface side of the cabin frame 20, and a rear wheel fender 29 is connected to the two sides of the rearward lower portion of the cabin frame 20. The steering wheel 6 or the like is connected to the front portion of the cabin frame 20, and the driver's seat 7 is supported by the rear portion of the cabin frame 20.

The front glass 16 is fixed across the left/right front vertical frame 23 constituting the cabin frame 20, and the front side of the cabin frame 20 is covered by the front glass 16. The rear glass 19 is mounted across the left/right rear vertical frame 25 constituting the cabin frame 20, and the rear side of the cabin frame 20 is covered by the rear glass 19.

The door 17 is slidably and openably mounted about the axial center of the rear end portion of the door on the entrance of the two sides of the cabin frame 20 formed across the front vertical frame 23 and the middle vertical frame 24, and a side glass 18 is slidably and openably mounted across the middle vertical frame 24 and the rear vertical frame 25.

The left and right sides of the front end of the cabin 8 configured in the manner described above are supported by a cabin bracket 30 extending in the left and right directions from the clutch housing 11 via a vibration isolation rubber 36, which is an example of an elastic member, as shown in FIGS. 2 and 3; and a support bracket 44 fixed to the lower end portion of the support frame 21 positioned in the left and right sides of the rear end of the cabin is supported by a rear cabin bracket 45 extending from a rear axle shaft case 47 via a vibration isolation rubber 46.

(Detailed Structure of the Cabin Bracket and Vibration Suppressing Weight)

Figure 4:
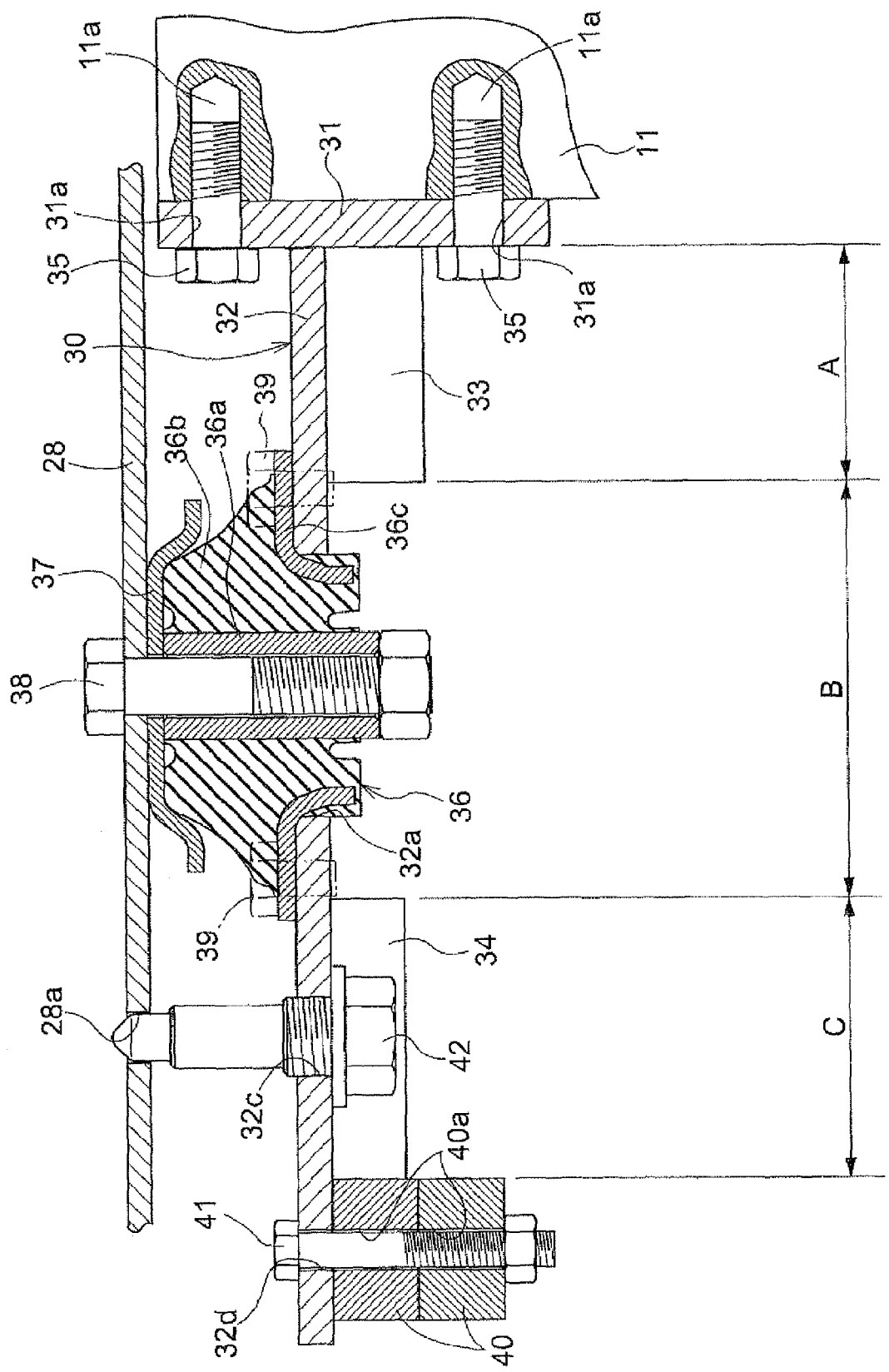
FIG. 4 is a longitudinal rear sectional view of the vicinity of the cabin bracket.
Figure 5:
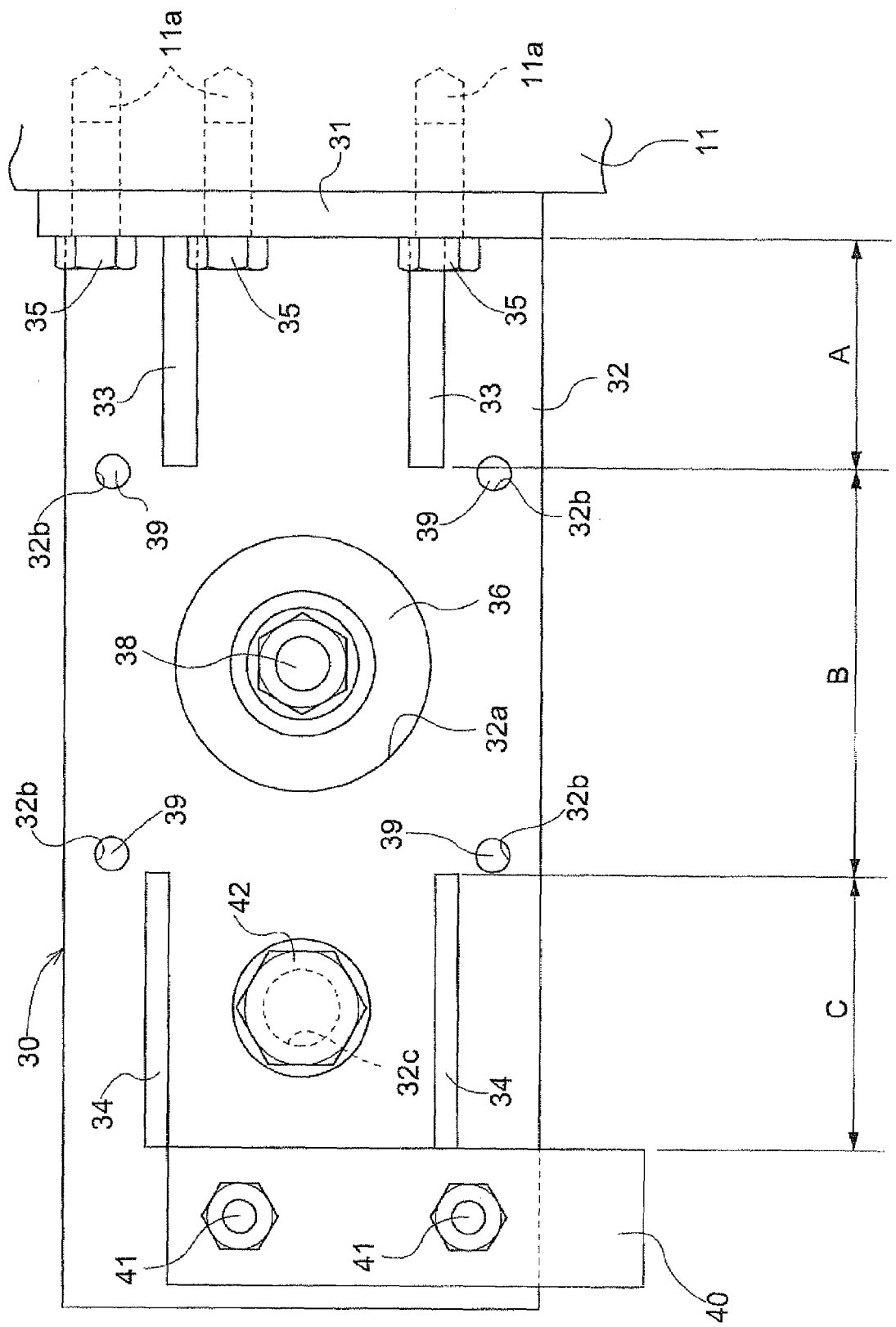
FIG. 5 is a bottom view of the vicinity of the cabin bracket.

The structure of the cabin bracket 30 and the vibration suppressing weight 40 according to the present invention will be described in detail with reference to FIGS. 4 and 5. FIG. 4 is a longitudinal rear sectional view of the vicinity of the cabin bracket 30, and FIG. 5 is a bottom view of the vicinity of the cabin bracket 30. In FIGS. 4 and 5, the cabin bracket 30 of the front left side portion of the cabin bracket 30 and other components of the cabin 8 is shown as an example, but the front right side portion of the cabin bracket 30 and other components of the cabin 8 have the same configuration other than the differences attributable to the left/right layout.

The cabin bracket 30 is composed of a fixed member 31 that is fixed to the clutch housing 11, a support member 32 that supports the cabin 8 via the vibration isolation rubber 36, a reinforcement member 33 disposed at the base of the cabin bracket 30, and an adjustment member 34 disposed at the distal end of the cabin bracket 30, as shown in FIGS. 4 and 5, and these members are integrally formed by welding.

A mounting hole 31*a* for tightening and fixing the cabin bracket 30 to a nut 11*a* disposed in the clutch housing 11 is machined into the fixed member 31 to allow the cabin bracket 30 to be fixed to the clutch housing 11 by bringing the fixed member 31 into contact with the cabin bracket 30 and tightening a bolt 35.

Machined into the support member 32 are a rubber insertion hole 32*a* for mounting the vibration isolation rubber 36, a nut 32*b* for tightening and fixing the vibration isolation rubber 36 to the cabin bracket 30, a positioning pin mounting hole 32*c*, and a vibration suppressing weight mounting hole 32*d*.

The vibration isolation rubber 36 is composed of a cylindrical member 36*a* that is inserted into a connecting bolt 38, a rubber vibration isolation body 36*b*, and a ring-shaped mounting bracket 36*c* into which a mounting hole has been machined. The lower portion of the cylindrically formed vibration isolation body 36*b* is inserted into the rubber insertion hole 32*a* of the support member 32, the mounting bracket 36*c* is brought into contact with the upper surface of the support member 32, and a bolt 39 is threaded into the nut 32*b* of the support member 32 and tightened and fixed in place, whereby the vibration isolation rubber 36 can be fixed to the cabin bracket 30.

The vibration suppressing weight 40 is a lead material having a high specific gravity and is molded into the form of a plate provided with a mounting hole 40*a*. The vibration suppressing weight 40 is configured so as to be brought from below into contact with the support member 32 and tightened and fixed in place using a bolt 41, whereby the vibration suppressing weight 40 can be fixed to the cabin bracket 30.

The vibration suppressing weight 40 is composed of a variably adjustable weight at the distal end of the cabin bracket 30 by changing the number of weights. For this reason, the number of vibration suppressing weights 40 can be used to modify and adjust the vibration characteristics in small increments even if used in tractors having different vibration characteristics according to the specifications of the cabin 8, engine 4, and other components.

The reinforcement member 33 is formed in the shape of a flat plate and is affixed in two locations in the front and rear across the fixed member 31 and the support member 32. The shape of the reinforcement member 33 and the length by which the member is extended outward from the fixed member 31 are set with consideration for the weight of the cabin 8, the driver, and other elements supported by the cabin bracket 30, i.e., the load supported by the cabin bracket 30, as well as the vibration isolation characteristics and the like of the vibration isolation rubber 36.

The adjustment member 34 is formed in the shape of a flat plate and is affixed in two locations in the front and rear of the lower surface side of the support member 32. The length and mounting position in the horizontal direction of the adjustment member 34 is set based on the characteristics and the like of the vibrations transmitted from the engine 4 and other components to the clutch housing 11, and the weight of the cabin 8, the driver, and the like supported by the cabin bracket 30. An advantageous cabin support structure that corresponds to different vibration characteristics can be achieved by modifying the shape and length of the adjustment member 34, even in tractors having, e.g., different cabin 8 and engine 4 specifications.

As described above, a higher rigidity portion A may include a reinforcement member 33 extending laterally outwardly of the vehicle body from said fixed member 31 of the cabin bracket 30, and a support member 32 in the position in which the reinforcement member 33 is disposed, and a lower rigidity portion B may include a support member 32 which supports the vibration isolation rubber 36 and which extends laterally outwardly from an end portion of the higher rigidity portion A. An auxiliary higher rigidity portion C may include an adjustment member 34 and a support member 32 in the position in which the adjustment member 34 is disposed; and the vibration suppressing weight 40 is mounted without a gap on the end surface of the outward side of the auxiliary higher rigidity portion C. The support member 32, reinforcement member 33, and adjustment member 34 are preferably plate-shaped bodies made of steel or another metal. The reinforcement member 33 and adjustment member 34 extend in the vertical direction, and the side surfaces of these members contact the support member 32, whereby the support member 32 is supported in the vertical direction.

A plate-shaped linkage member 37 is fixed to the lower surface side of the floor panel 28 that forms the lower end surface of the cabin frame 20, as shown in FIGS. 4 and 5, and the linkage member 37 is brought into contact with the upper surface of the vibration isolation rubber 36, and the connecting bolt 38 is inserted into the cylindrical member 36a of the vibration isolation rubber 36 and tightened and fixed in place, whereby the configuration allows the cabin 8 and the vibration isolation rubber 36 to be connected and the cabin 8 to be supported by the cabin bracket 30 via the vibration isolation rubber 36.

The cabin bracket 30 is configured and the cabin 8 is supported in the manner described above, whereby the bending strength can be assured in the vertical direction of the cabin bracket 30 against the bending moment that acts on the cabin bracket 30 by supporting the cabin 8 with the reinforcement member 33 of the cabin bracket 30, and the lower rigidity portion B that has lower rigidity in the vertical direction can thus be configured.

A positioning hole 28a provided to the floor panel 28 is aligned with the distal end of a positioning pin 42, and the cabin 8 is mounted on the cabin bracket 30 in a state in which the positioning pin 42 is fixed in the positioning pin mounting hole 32c of the support member 32, whereby the positioning of the cabin 8 with respect to the cabin bracket 30 in the forward, rearward, left, and right directions can be rapidly carried out in a simple manner.

[State of Vibration Transmission]

An example of the vibration transmission ratio (transmissibility) for each frequency of the tractor on which the cabin bracket 30 according to the present invention is mounted will be described with reference to FIGS. 6 and 7. The frequency, vibration transmission ratio, resonance frequency region, and other numerical values described below will differ according to the structure of the cabin 8 and the vibration characteristics and other parameters of the vibration isolation rubber 36, and the numerical values are shown as examples.

Figure 6:
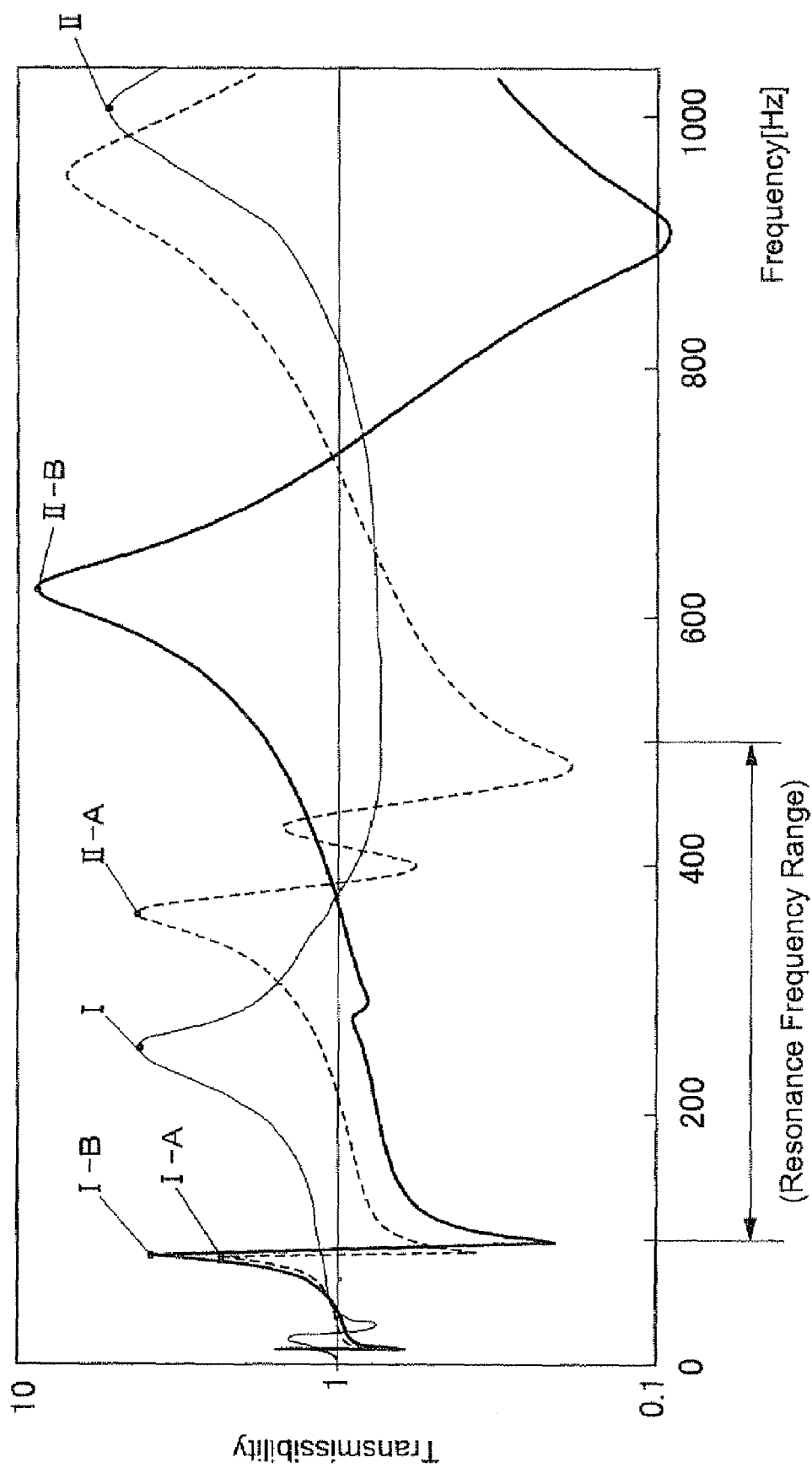
FIG. 6 is a graph showing an example of the relationship between the frequency and the vibration transmission ratio.

The horizontal axis of FIG. 6 represents the magnitude (Hz) of the frequency, and the vertical axis of FIG. 6 represents the vibration transmission ratio (dimensionless value also referred to as transmissibility) of the cabin bracket 30 from the clutch housing 11 to the vibration isolation rubber 36, i.e., a value obtained by dividing the input vibration (vibrations transmitted from the cabin bracket 30 to the mounting bracket 36c of the vibration isolation rubber 36) of the vibration isolation rubber 36 by the output vibration (vibrations transmitted from the engine 4 or the like to the fixed member 31 of the cabin bracket 30 via the clutch housing 11) of the clutch housing 11. The units of the input and output vibrations represent acceleration or the magnitude of force.

For example, when the vibration transmission ratio is 1, the output vibrations of the clutch housing 11 are transmitted to the vibration isolation rubber 36 without being reduced in magnitude. In other words, when a comparison is made using the same frequency, fewer vibrations are transmitted to the vibration isolation rubber 36 as the vibration transmission ratio is reduced, and the vibrations from the engine 4 or the like transmitted to the cabin 8 via the vibration isolation rubber 36 are reduced.

Figure 7:
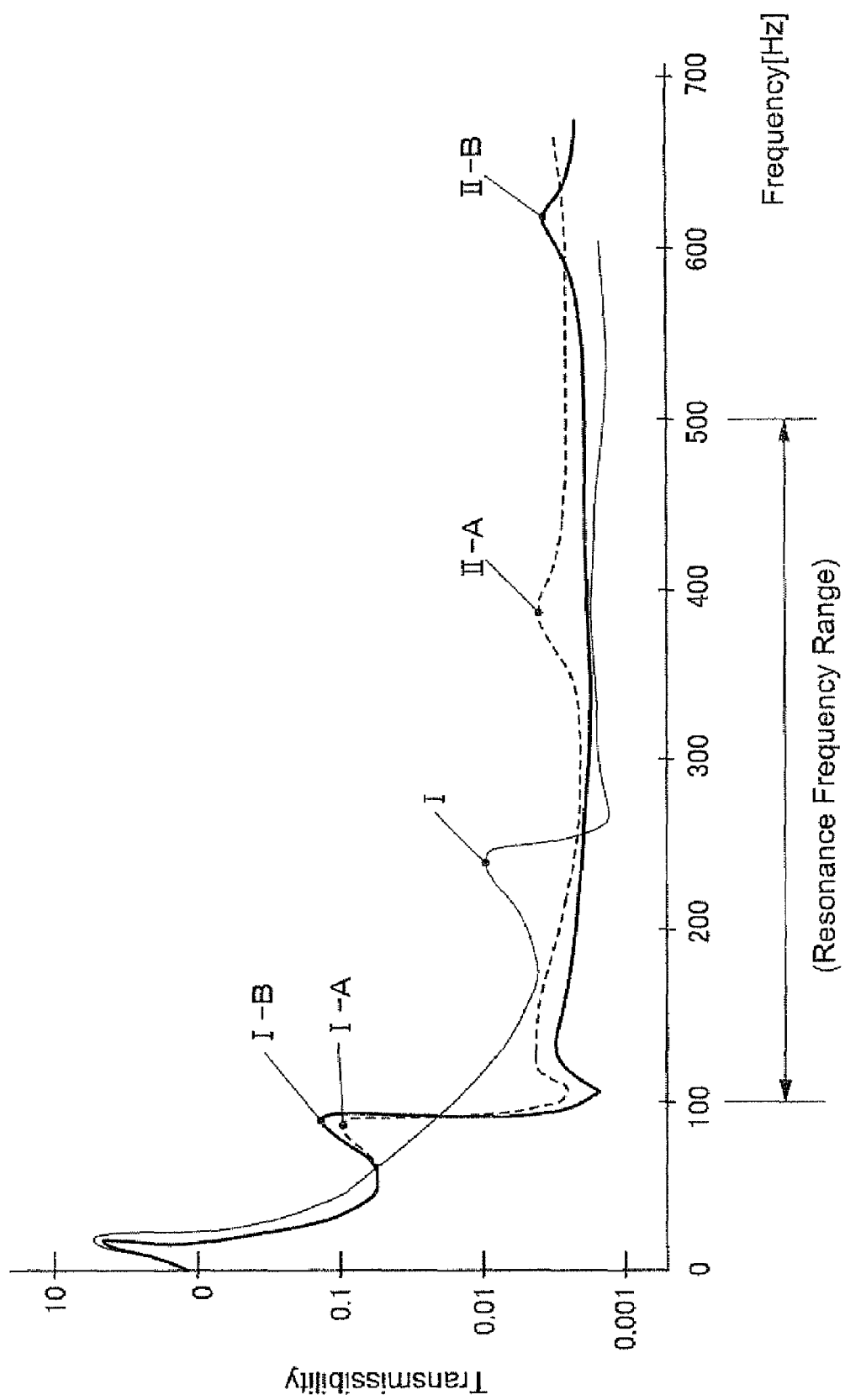
FIG. 7 is a graph showing an example of the relationship between the frequency and the vibration transmission ratio.

The horizontal axis of FIG. 7 represents the magnitude (Hz) of the frequency, and the vertical axis of FIG. 7 represents the vibration transmission ratio (dimensionless value) of the cabin bracket 30 from the clutch housing 11 to the linkage member 37, i.e., a value obtained by dividing the input vibration (vibrations transmitted from the cabin bracket 30 to the linkage member 37 via the vibration isolation rubber 36) of the linkage member 37 by the output vibration (vibrations transmitted from the engine 4 or the like to the fixed member 31 of the cabin bracket 30 via the clutch housing 11) of the clutch housing 11. Unlike FIG. 6, FIG. 7 shows the vibration transmission ratio obtained via a vibration isolation rubber 36 having a lower characteristic frequency, and the value of the vibration transmission ratio is therefore lower than that in FIG. 6.

The thick lines shown in FIGS. 6 and 7 are curved lines resulting from plotting the measured values of the vibration transmission ratio at each frequency in a tractor in which the cabin bracket 30 described above has been adopted. The thin lines shown in FIGS. 6 and 7 are curved lines resulting from plotting the measured values of the vibration transmission ratio at each frequency in a tractor in which a conventional cabin bracket 50 (see FIG. 10) has been adopted. The dotted lines shown in FIGS. 6 and 7 are curved lines resulting from plotting the measured values of the vibration transmission ratio at each frequency in a tractor in which a cabin bracket 30 (see FIGS. 8 and 9) is adopted without mounting an adjustment member 34.

In a conventional cabin bracket 50, since the rigidity of the cabin bracket 50 is high and the characteristic vibration is considerable, the vibration transmission ratio increases together with the increase in frequency and exhibits a characteristic in which a first peak value (I) is reached at a frequency of about 250 Hz and a second peak value (II) reached at a frequency of about 1,000 Hz, as shown by the thin lines in FIGS. 6 and 7.

When the cabin bracket 30 according to the present invention is adopted, the characteristic frequency of the cabin bracket 30 is low because the rigidity of the cabin bracket 30 is kept low, as shown by the thick lines in FIGS. 6 and 7. For this reason, the vibration transmission ratio increases together with the increase in frequency, reaches a first peak value (I-B) at a frequency of about 90 Hz, decreases thereafter, and then gradually increases and reaches a second peak value (II-B) at a frequency of about 600 Hz.

In other words, the first peak value (I) and the second peak value (II) of the vibration transmission ratio in a conventional cabin bracket 50 can be moved to a first peak value (I-B) and a second peak value (II-B) that have a lower frequency by keeping the rigidity of the cabin bracket 30 low and mounting a vibration suppressing weight 40.

When a cabin bracket 30 in which an adjustment member 34 is not mounted is adopted, the characteristic frequency of the cabin bracket 30 is low because the rigidity of the cabin bracket 30 is kept low, as shown by the dotted lines FIGS. 6 and 7. For this reason, the vibration transmission ratio reaches a first peak value (I-A) at a frequency of about 90 Hz. The vibration transmission ratio then decreases and then gradually increases to reach a second peak value (II-A) at a frequency of about 350 Hz.

In other words, since the adjustment member 34 is not mounted, the vibration transmission ratio is considerable in an area in which the frequency is low (in the vicinity 100 Hz to 400 Hz) in comparison with the cabin bracket 30 shown by the thick lines of FIGS. 6 and 7, and the vibration transmission ratio reaches a second peak value (II-A) at a frequency of about 350 Hz. Specifically, the second peak value can be moved from II-A to II-B without moving the first peak values (I-A and I-B) by providing an adjustment member 34.

For example, in a tractor, experimental data (not shown) has been obtained that indicates that vibrations in a frequency range of 100 to 500 Hz (hereinafter defined as the resonance frequency range) selected from the vibrations transmitted from the engine 4 and the like to the cabin 8 via the cabin bracket 30 readily resonate with the resonance frequency of the cabin space, which is a frequency that creates a cacophony for a driver or others in the cabin, and readily cause the driving environment to worsen. For this reason, the first peak value (I) can be moved to 100 Hz or less (I-B) due to the presence of the low-rigidity cabin bracket 30 and the vibration suppressing weight 40, the second peak value (II) can be moved to 500 Hz or higher (II-B) using the adjustment member 34, and a configuration can be achieved in which the first and second peak values of the vibration transmission ratio do not enter into a resonance frequency area that creates a cacophony for the driver and others in the cabin.

In accordance with the above, the area of frequency in which the vibration transmission ratio is high, such as the first peak value (I) of a conventional cabin bracket 50 and the second peak value (II-A) of a cabin bracket 30 in which an adjustment member 34 is not mounted, as shown in FIG. 7, is reduced in a range in which the resonance frequency area that forms a cacophony for the driver and others in the cabin, and the vibration transmission ratio in this range can be averaged to a lower frequency. As a result, a configuration can be achieved in which the resonance frequency of air in the cabin does not readily match the characteristic frequency transmitted to the cabin 8 via the cabin bracket 30 and the vibration isolation rubber 36.

(Structure of a Convention Cabin Bracket)

Figure 10:
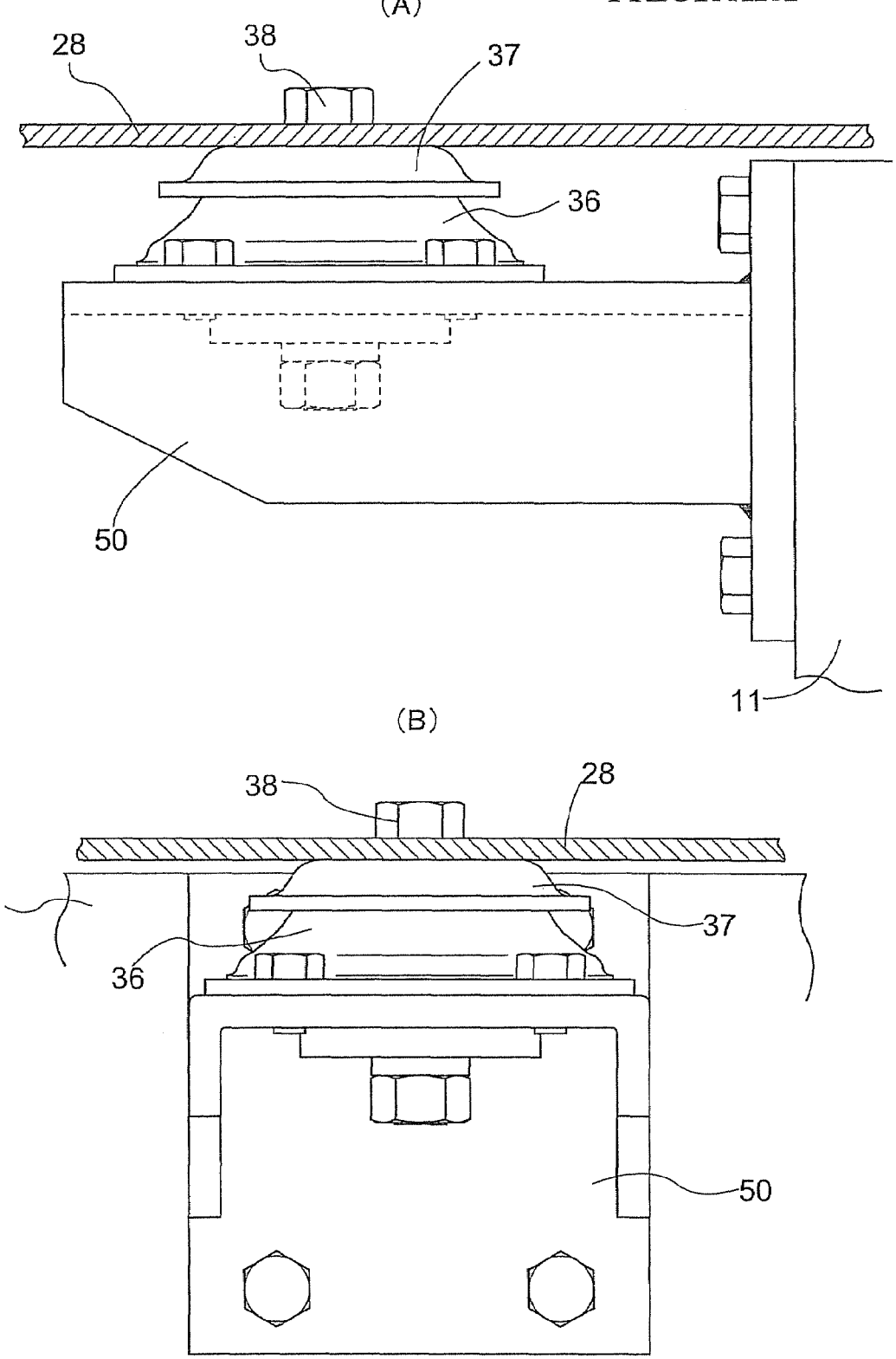
FIG. 10 is a schematic diagram showing the structure of a conventional cabin bracket.

FIG. 10 is a schematic diagram showing the structure of a conventional cabin bracket 50. FIG. 10A shows a rear view of the vicinity of the cabin bracket 50, and FIG. 10B shows a side view of the vicinity of the cabin bracket 50.

The conventional cabin bracket 50 is molded in the form of an inverted letter 'C' whose cross-sectional shape faces downward, as shown in FIG. 10, and a highly rigid structure is adopted across the distal end of the cabin bracket 50 from the portion fixed to the clutch housing 11. The structure of the conventional cabin bracket 50 shown in FIG. 10 is the structure of the conventional cabin bracket 50 used in the graphs of FIGS. 6 and 7, which are shown for comparison in the description of the present invention.

First Modified Embodiment of the Invention

Figure 8:
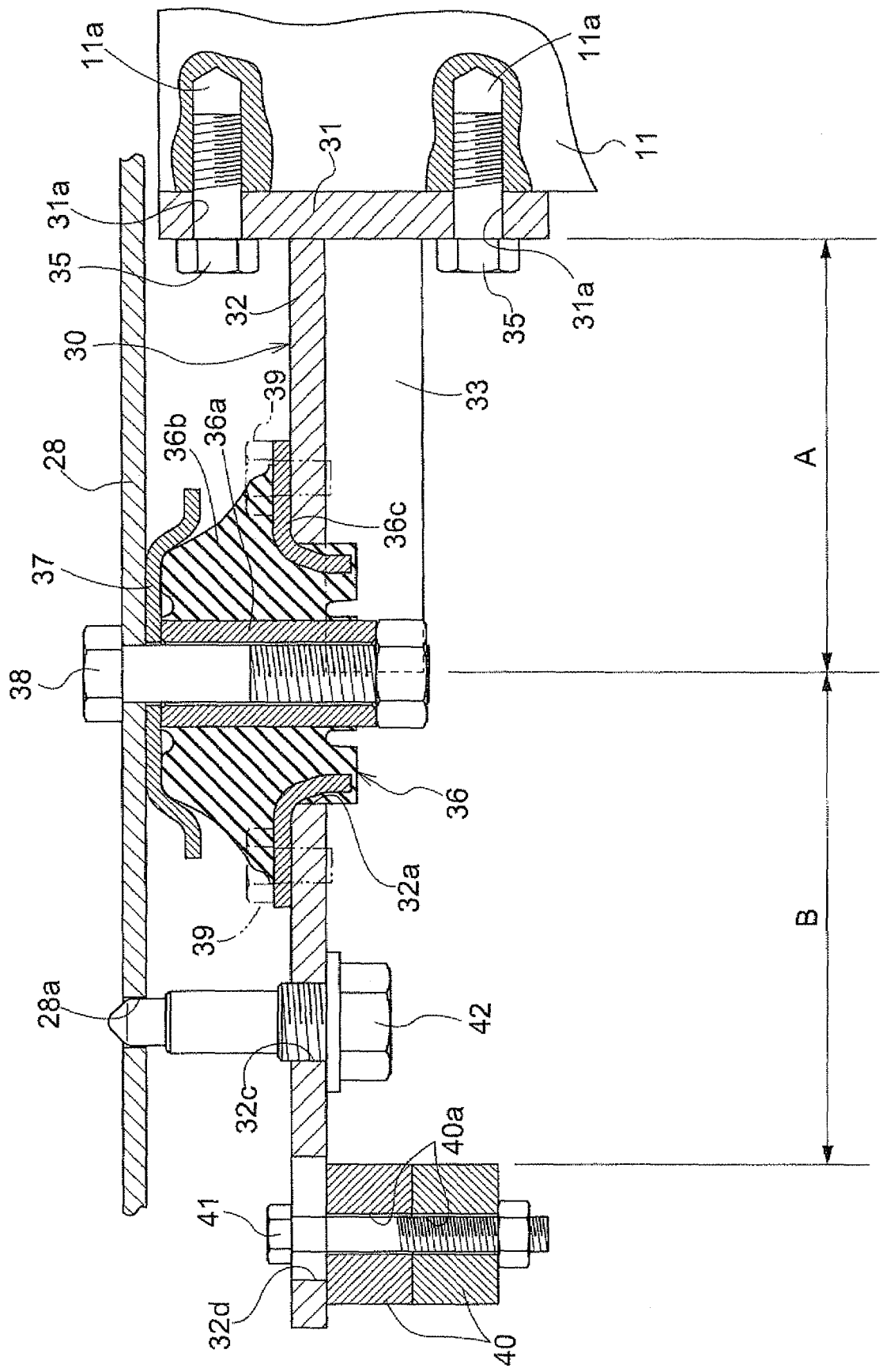
FIG. 8 is a longitudinal rear sectional view of the vicinity of the cabin bracket in a first modified embodiment of the invention.
Figure 9:
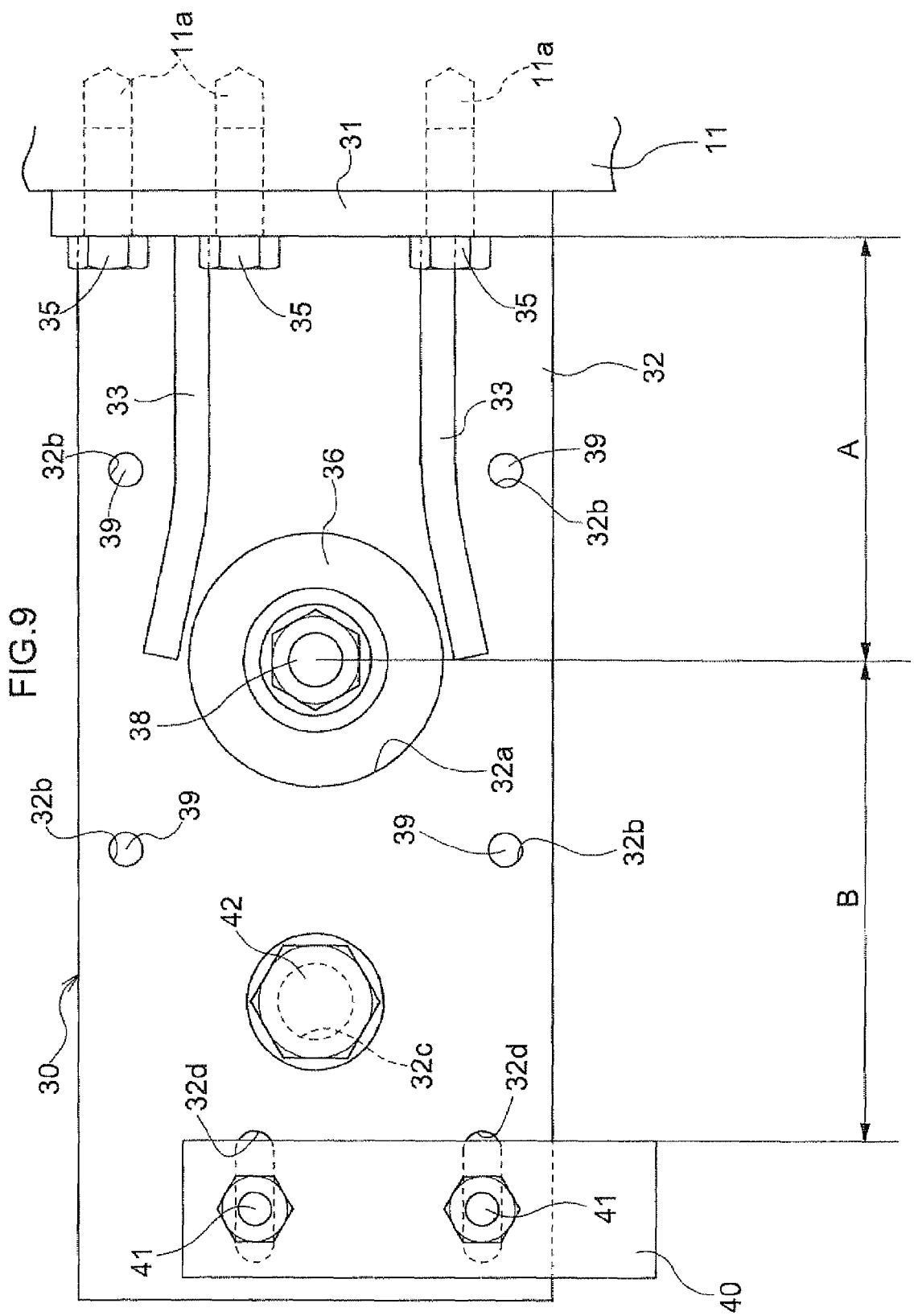
FIG. 9 is a bottom view of the vicinity of the cabin bracket in a first modified embodiment of the invention.

In the embodiment described above, an example was described in which the cabin bracket 30 is provided with a fixed member 31, a support member 32, a reinforcement member 33, and an adjustment member 34, but a cabin bracket 30 such as that shown in FIGS. 8 and 9 may be adopted. The configuration other than that described above is the same as the embodiment described above.

FIG. 8 is a longitudinal rear sectional view of the vicinity of the cabin bracket 30; and FIG. 9 is a bottom view of the vicinity of the cabin bracket 30. FIGS. 8 and 9 show an example of the cabin bracket 30 and other components of the front left portion of the cabin 8, but the front right side portion of the cabin bracket 30 and other components of the front left portion of the cabin 8 have the same configuration other than the differences attributable to the left/right layout.

The cabin bracket 30 is composed of a fixed member 31 that is fixed to the clutch housing 11, a support member 32 that supports the cabin 8 via the vibration isolation rubber 36, and a reinforcement member 33 disposed at the base of the cabin bracket 30, as shown in FIGS. 8 and 9, and these members are integrally formed by welding.

The reinforcement member 33 is molded into the form of a slightly curved longitudinal flat tie plate that extends from the fixed member 31 to the vicinity of the center line of the rubber insertion hole 32a of the support member 32, and is affixed at two locations in the front and rear of the fixed member 31 and support member 32.

The vibration suppressing weight mounting hole 32d is machined as a long hole in the left/right direction, and is configured so that the position of the vibration suppressing weight 40 in the left/right direction can be variably adjusted. With such a configuration, the vibration characteristics can be adjusted in small increments, and vibrations transmitted from the vehicle body 3 to the cabin 8 can be reduced even if used in tractors having different vibration characteristics according to the specifications of the cabin 8, engine 4, and other components.

As described above, the higher rigidity portion A is composed of a reinforcement member 33 extended to the outward side from the fixed member 31 of the cabin bracket 30, and a support member 32 in a position in which the reinforcement member 33 is disposed; and the lower rigidity portion B is composed of a support member 32 extended to the outward side from the end portion of the outward side of the higher rigidity portion A.

For example, the structure of the cabin bracket 30 can be simplified and manufacturing costs can be reduced while averaging the frequencies in the range of the resonance frequency area to a lower frequency by adopting a cabin bracket 30 without an adjustment member 34 in a vehicle with a cabin having a low resonance frequency area.

Second Modified Embodiment of the Invention

In the embodiment described above, an example was described in which the cabin bracket 30 is supported on the clutch housing 11 extended rearward from the engine 4, but the bracket may also be a member that is different than the member that supports the cabin bracket 30 on the vehicle body 3. For example, a configuration that supports the cabin bracket 30 on the body frame may be adopted in a vehicle in which the body frame (not shown) extends rearward from the engine 4.

In the embodiment described above, an example was described in which the two ends of the front portion of the cabin 8 in the left/right direction are supported by the cabin bracket 30, but the configuration of the cabin bracket 30 described above may be adopted even when the center portion in the front/rear direction of the cabin 8 is supported or the two ends in the rear portion of the cabin are supported.

The structure of the cabin bracket 30 and other components described in the embodiment above is an example, and different structures may be adopted as long as the same function is achieved. For example, it is possible to use a different shape or the like for the mounting structure and the structure of the vibration isolation rubber 36 shown as an example of the elastic member, the shape and mounting position of the fixed member 31, the support member 32, the reinforcement member 33, the adjustment member 34 constituting the cabin bracket 30, the mounting position of the vibration isolation rubber 36 in relation to the cabin bracket 30, the shape and mounting method of the vibration suppressing weight 40, and other components.

Third Modified Embodiment of the Invention

In the embodiment described above, an example was described in which the cabin bracket 30 and vibration suppressing weight 40 are provided to a tractor as an example of a vehicle, but application can also be made in the same manner to different vehicles as long as the vehicle is a vehicle with a cabin. For example, application can also be made in a similar manner to a combine or another agricultural vehicle, a civil engineering vehicle, a construction vehicle, or other vehicles with a cabin.

What is claimed is:

1. A vehicle with a cabin comprising:
   a vehicle body supported by a plurality of wheels;
   a cabin bracket supported by a portion of said vehicle;
   an elastic member disposed between said cabin bracket and said cabin, wherein
   said cabin bracket comprises:
      a fixed member fixed to said portion of said vehicle,
      a higher rigidity portion extended laterally outwardly of said portion of said vehicle from said fixed member, and
      a lower rigidity portion that extends laterally outwardly from a lateral outward end portion of said higher rigidity portion, and that is lower in rigidity in the vertical direction than said higher rigidity portion;
   a reinforcement member extending in a longitudinal direction of said cabin bracket in a region corresponding to said higher rigidity portion, said reinforcement member contacting said cabin bracket only in said region corresponding to said higher rigidity portion to increase rigidity of said region corresponding to said higher rigidity portion; and
   a vibration suppressing weight disposed at a lateral outward end portion of said cabin bracket.

2. The vehicle with a cabin according to claim 1, wherein said cabin bracket is provided with an auxiliary high rigidity portion that extends laterally outwardly from a lateral outward end portion of said low rigidity portion, and that is more rigid in the vertical direction than said low rigidity portion.

3. The vehicle with a cabin according to claim 2, wherein said auxiliary high rigidity portion includes a support member fixed to said fixed member, and an adjustment member formed into a plate extending in said longitudinal direction of said cabin bracket in a region corresponding to said auxiliary high rigidity portion, said adjustment member contacting said support member and supporting said support member from below.

4. The vehicle with a cabin according to claim 1, wherein said reinforcement member is a plate-shaped body.

5. The vehicle with a cabin according to claim 1, wherein a hole for mounting said elastic member is formed in said low rigidity portion.

* * * * *